May 11, 1926.　　　　　　　　　　　　　　1,584,670
J. SLEPIAN
VOLT AMPERE METER
Filed March 5, 1923
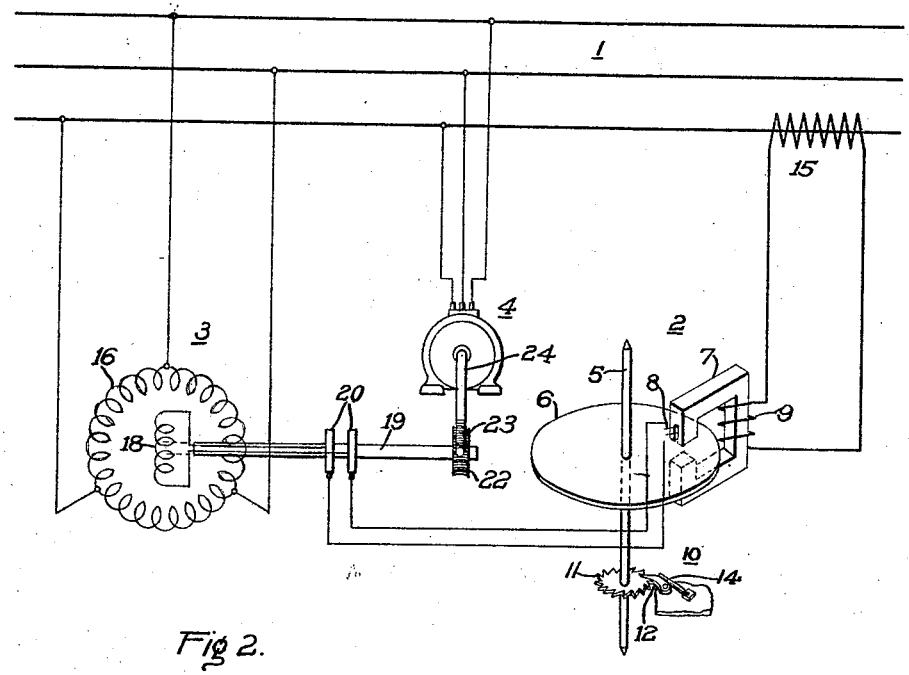
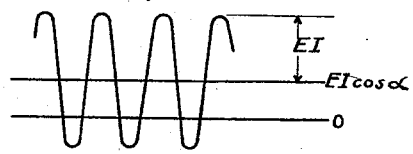
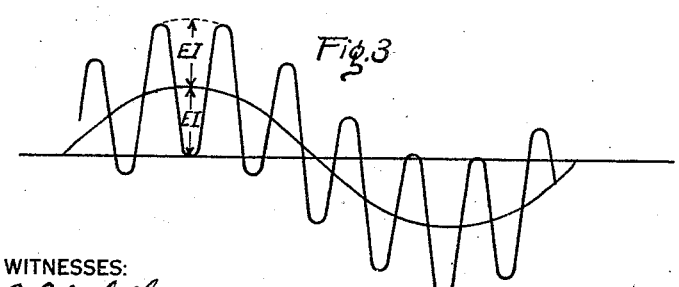
WITNESSES:　　　　　　　　　　　　　　INVENTOR.
　　　　　　　　　　　　　　　　　　Joseph Slepian
　　　　　　　　　　　　　　　　　　BY
　　　　　　　　　　　　　　　　　　ATTORNEY Patented May 11, 1926.

1,584,670

UNITED STATES PATENT OFFICE.

JOSEPH SLEPIAN, OF SWISSVALE, PENNSYLVANIA, ASSIGNOR TO WESTINGHOUSE ELECTRIC & MANUFACTURING COMPANY, A CORPORATION OF PENNSYLVANIA.

VOLT-AMPERE METER.

Application filed March 5, 1923. Serial No. 622,791.

My invention relates to electrical measuring instruments and particularly to methods of, and means for, measuring the apparent energy of alternating-current circuits.

One object of my invention is to provide a method of measuring the volt-ampere-hours of an alternating-current circuit in which the frequency of a current proportional to one of the components of the actual energy of the circuit is so modified as to cause the current of modified frequency, in co-operation with a current proportional to the other component of the actual energy, to produce an effect in accordance with the apparent energy of the circuit.

Another object of my invention is to provide a volt-ampere meter that shall be simple in construction and effective in operation.

In practicing my invention, I provide a meter, similar to an ordinary wattmeter, in which one of the coils is energized in proportion to one of the components of the apparent energy of a circuit and in which retrogressive movement of the movable element is prevented. A device similar to a phase-shifting transformer has a distributed primary winding connected to the circuit to be energized in accordance with the other component of the apparent energy. A secondary coil of the transformer, rotated at a relatively slow constant speed, is connected to the other coil of the wattmeter and supplies the other coil with current that is proportional to the other component of the apparent energy with constantly changing phase relation.

By reason of the one-way movement of the meter element, the mean effective torque will be proportional to this current, and independent of its original phase.

Figure 1 of the accompanying drawing is a diagrammatic view of an instrument embodying my invention, and Figs. 2 and 3 are curves illustrating certain current and voltage relations thereof.

My invention comprises, in general, an alternating-current circuit 1, a meter 2, a transformer 3 and a motor 4.

The meter 2, similar to an ordinary watt-hour meter, comprises a shaft 5, an armature or disk 6, a core member 7, coils 8 and 9 and a device 10 for preventing retrogressive movement of the shaft 5.

The device 10 may be of any suitable construction, such as a ratchet wheel 11 mounted on the shaft 5, a pawl 12 and a spring 14 for holding the pawl 12 against the wheel 11.

The coil 9 is connected to a current transformer 15.

The transformer 3 comprises a distributed primary voltage winding 16 connected to the circuit 1 and a rotatable secondary winding 18 mounted on a shaft 19. The winding 18 is connected, through slip rings 20, to the coil 8 of the meter 2.

The shaft 19 is adapted to be relatively slowly rotated at a constant speed, as by the motor 4 connected to the circuit 1, and may be provided with a worm wheel 22 for engagement with a worm screw 23 on the motor shaft 24.

In operation, the meter 2 operates similarly to an ordinary watt-hour meter, except that the shaft 5 is permitted to rotate in the forward direction only, by the device 10. The coils 8 and 9, the latter of which is energized in proportion to the current of the circuit 1, generate co-operating fluxes in the core member 7 which co-act, in the usual manner, to rotate the disk 6.

The winding 18, being inductively related to the winding 16, will have a current induced therein that is proportional, in magnitude, to the voltage of the circuit 1.

The winding 18 is mechanically rotated by the motor 4 at a slow constant speed relative to the voltage frequency of the circuit 1. Hence, there will be a constantly changing phase relation between the primary and secondary voltages. The rate at which the phase relation changes will depend upon the relative number of poles of the windings 16 and 18 and the ratio between the primary-voltage frequency and the number of revolutions of the winding 18. This rate of change may be adjusted to have any desired value. In other words, the power delivered by the coils 8 and 9 will be equal to the product of the volts, the amperes and the average or integral sum of the values taken by the cosine of the phase angle of the voltage of the winding 18. If the disk 6 were permitted to rotate in both directions, as the phase angle of the voltage supplied by the winding 18 changed, the disk would rotate sometimes forwardly and sometimes backwardly and, with a constant load on the circuit 1, the integrated effect would be zero. This is because rotation of the coil 18 causes the current and voltage to pass through all positive and negative angles or phase relations, that is, positive for one half revolution of the coil 18 and negative for the other half revolution.

The above actions may also be described in terms of the two frequencies that are respectively supplied to the coils 8 and 9. If the member 18 is stationary and the currents supplied to the coils 8 and 9 are of the same frequency, the torque on the disk member 6 will be a quantity of double frequency, and amplitude EI, alternating about the constant value EI cos α, as shown in Fig. 2, where E is the voltage on the coil 9, I is the current in the coil 8 and α is the angle between them.

When the member 18 is rotated, the current supplied by the coil 8 has a frequency different from that in the coil 9. The torque is then a quantity which alternates with a frequency equal to the sum of the frequencies of the currents in the coils 8 and 9 about a mean value which has an amplitude EI and alternates about the zero line with a frequency equal to the difference between the frequencies of the currents in the coils 8 and 9, as shown in Fig. 3.

The device 10 prevents rotation of the disk 6 in the negative direction, hence a progressive movement of the disk is permitted that is proportional to the product of the current of the circuit 1 and a current, which, so far as its effect on the disk is concerned, is in constant phase relation thereto and variable in magnitude in proportion to the voltage of the circuit 1.

Evidently, in the last figure, only the positive values of the torque are integrated. The result will be proportional to EI and the influence of the phase angle has disappeared.

The rate of rotation of the coil 18 may be adjusted so that there will be little likelihood of fluctuations in load synchronizing with it and thus introducing errors. With fairly constant relatively slowly changing loads on the circuit 1, such as usual industrial loads, only a very slow speed of rotation of the coil 18 will be required.

While I have shown and described a particular form of my invention, changes may be effected therein without departing from the spirit and scope thereof, as set forth in the appended claims.

I claim as my invention:—

1. The method of measuring a function of a plurality of alternating electrical-circuit quantities of varying phase relation which comprises continuously modifying the phase relation of quantities proportional to the circuit quantities to produce an effect independent of the actual phase relation of the circuit quantities.

2. The method of measuring a function of a plurality of alternating electrical-circuit quantities of varying phase relation which comprises continuously modifying the phase relation of quantities proportional to the circuit quantities and causing the modified proportional quantities to cooperate in accordance with the circuit function to be measured.

3. The method of measuring the volt-amperes of an alternating-current circuit which comprises modifying at a constant rate the phase relation of quantities proportional to the current and the voltage of the circuit and causing the modified proportional quantities to cooperate.

4. The combination with an alternating-current circuit, of a movable element, current and voltage-responsive means for actuating said element, and means for changing the frequency of the current in one of said responsive means.

5. The combination with an alternating-current circuit, of a movable element, current and voltage-responsive means for actuating said element and means in circuit with one of said means for cyclically varying the phase relation of currents in said current and voltage-responsive elements.

6. The combination with an alternating-current circuit, a movable element and current and voltage-responsive means for actuating the element, of a transformer in circuit with one of said means comprising two coils, and means for moving said coils relatively.

7. The combination with an alternating-current circuit, a movable element and current-and-voltage-responsive means for actuating the element, of a transformer in circuit with one of said means comprising two coils, and means for moving said coils relatively at a constant rate.

8. The combination with an alternating-current circuit, a movable element and coils for actuating the element in proportion to the current and the voltage of the circuit, of a winding connected to the circuit, a second winding having inductive and relatively movable relation to the first winding and connected in circuit with one of said coils, means for moving said windings relatively at a constant rate and means for permitting the element to move in one direction only.

9. The combination with an alternating-current circuit, of a rotatable meter element, a core member therefor, coils for energizing the core member in proportion to the current and the voltage of the circuit, a winding connected to the circuit, a second winding inductively related to the first winding and connected to one of said coils, means for moving said windings relatively at a constant rate, and means for permitting the meter element to rotate in one direction only.

10. The combination with an alternating-current circuit, a movable element and current and voltage-responsive means for actuating the element, of a transformer in circuit with one of said means comprising two coils and means for moving said coils relatively at a constant rate.

11. The method of measuring a function of a plurality of alternating electrical-circuit quantities of varying phase relation which comprises changing the frequency relation of quantities proportional to the circuit quantities at a constant rate to produce an effect independent of the actual phase relation of the circuit quantities and causing the quantities of changed frequency relation to co-operate.

In testimony whereof, I have hereunto subscribed my name this 27th day of February, 1923.

JOSEPH SLEPIAN.